(No Model.)
B. A. FISKE.
METHOD OF FINDING RANGE AND POSITION OF DISTANT OBJECTS.
No. 406,830.   Patented July 9, 1889.
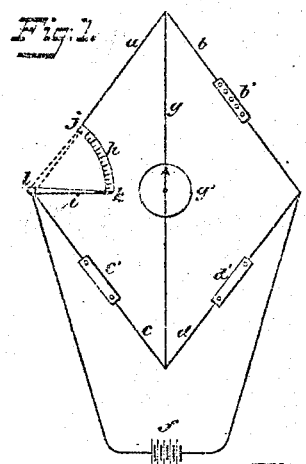
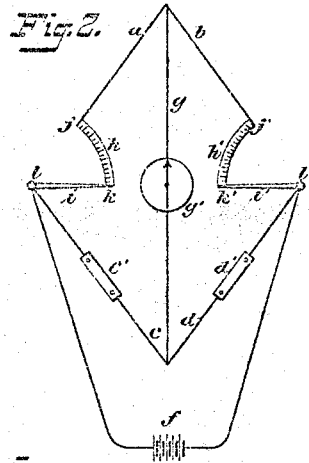
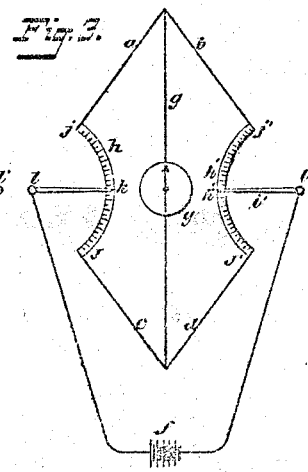
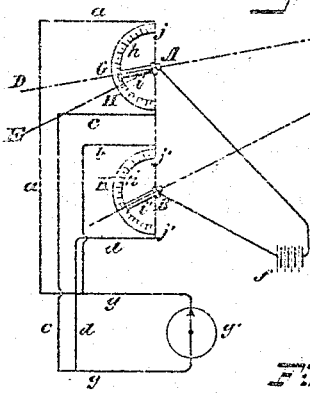
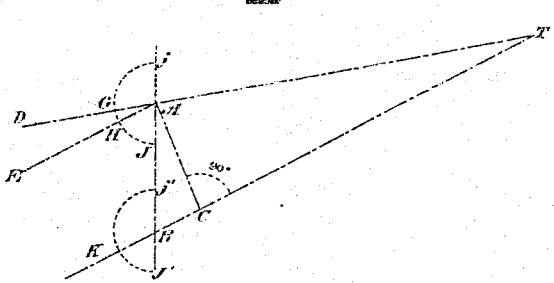
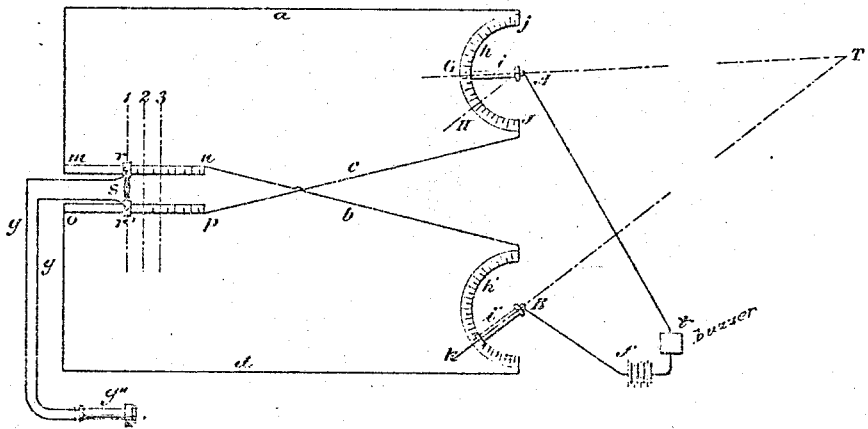
WITNESSES:
Gustave Dieterich
William Goebel
INVENTOR.
Bradley A. Fiske
BY Park Benjamin
His ATTORNEY.

UNITED STATES PATENT OFFICE.

BRADLEY ALLAN FISKE, OF THE UNITED STATES NAVY.

METHOD OF FINDING RANGE AND POSITION OF DISTANT OBJECTS.

SPECIFICATION forming part of Letters Patent No. 406,830, dated July 9, 1889.

Original application filed October 17, 1888, Serial No. 288,505. Divided and this application filed February 27, 1889. Serial No. 301,311. (No model.)

*To all whom it may concern:*

Be it known that I, BRADLEY ALLAN FISKE, of the United States Navy, have invented a new and useful Improvement in the Method of Finding Range and Position of Distant Objects, of which the following is a specification.

My invention consists in a new method of finding the range and position of a distant object, which depends upon the determination of a fractional portion of a conducting-body bearing in length a ratio to the angle included between two lines of sight directed upon said distant object and the measurement of the electrical resistance of said length.

The accompanying drawings are (Figure 4 excepted) all electrical diagrams, not drawn to scale, and symbolically represent the invention. In Fig. 1 is shown a Wheatstone bridge, in one member $a$ of which is arranged a body of conducting material in arc form and a movable arm traversing the same. In Fig. 2 is shown a Wheatstone bridge having arcs and movable arms arranged in two members $a\ b$. In Fig. 3 is shown a Wheatstone bridge in which arcs connect adjacent members, as $a\ c$ and $b\ d$, and movable arms sweeping over said arcs are connected to the battery. Fig. 4 is a mathematical diagram illustrating the method of determining the angle ATC. Fig. 5 shows a disposition of the range-finder in connection with a galvanometer, and Fig. 6 the same in connection with a telephone.

Similar letters of reference indicate like parts.

In Fig. 1, let $a\ b\ c\ d$ represent the four members of an ordinary Wheatstone bridge, and $g$ the transverse member, in which is connected the galvanometer $g'$. A battery $f$ is also connected to the bridge in the usual way. In the members $c$ and $d$ are placed the fixed resistances $c'$ and $d'$, and in the member $b$ the variable resistance $b'$ also, as usual. One wire from battery $f$, however, connects to the end of member $c$, and also to the pivot $l$ of a swinging arm $i$. The extremity $k$ of arm $i$ moves over and maintains electrical contact with an arc $h$ of conducting material, which has one extremity $j$ connected, as shown, to the member $a$ of the bridge. It is obvious that when the arm $i$ is in the position shown in full lines in Fig. 1 then the current will traverse the whole arc $h$, and when said arm is in the position indicated by dotted lines, Fig. 1, then the arc $h$ will be cut out and the current will pass directly to member $a$. Now assume the arc $h$ to be made of such material and so proportioned that its electrical resistance to a current traversing it will be proportional to the length of arc included between the contact end $k$ of arm $i$ and the connecting-point $j$ of member $a$ with said arc. Therefore the resistance interposed in the member $a$ of the bridge will be commensurate with the angle $j\ l\ k$, and if this resistance be known the angle is also known. Let it now be assumed that the galvanometer $g'$ and variable resistance $b'$ be located at some point distant from the moving arm $i$, from which said arm is invisible or inaccessible. Clearly, then, an observer stationed at the galvanometer $g'$ and resistance $b'$ can, by noting the galvanometer and adjusting the resistance in the usual way, determine the resistance equilibrating any position of arm $i$ along the arc $h$, and so discover the angle of adjustment of said arc; or, having adjusted the resistance $b'$ at some given figure, the observer may, by simply noting the galvanometer or any other suitable indicating device, visual or audible, determine when the arm $i$ is placed at a desired angle corresponding to the adjusted resistance, and this indicating device may obviously be at the place where the moving arm is located, so that the operator there may thus know when he has placed the arm at the predetermined point or at the distant station, so that the operator in charge of the resistance $b'$ may know that the arm has been adjusted properly; or two indicating devices in the same circuit may give warning to both operators, as above, simultaneously.

Various practical applications of this apparatus will readily suggest themselves to those skilled in the art. Thus, for example, the elevation or training of a gun may thus be determined or recognized from a distant point, the longitudinal axis of the gun corresponding to the arm $i$.

Referring now to Fig. 2, it will be apparent that in lieu of the variable resistance $b'$ in the member $b$ there is arranged an arc $h'$ and swinging arm $i'$. The arc $h'$ is connected at one end $j'$ to the member $b$, and the swinging arm $i'$ makes contact at one end $k'$ with said arc, and to its pivot $l'$ is connected the member $d$. The arrangement and construction of arc $h'$ and arm $i'$ are similar to that of arc $h$ and arm $i$. Consequently when the arm $i$ is set at a certain point on the arc $h$ the arm $i'$ must be set at the corresponding point on the arc $h'$, in order that the resistance of the lengths of the arcs $h\ h'$, respectively, between the point $k$ and point $h$ and point $k'$ and point $h'$ may balance; hence if the arm $k$ be set at a certain angle the observer at arm $k$ may recognize that angle by noting the position of the arm $k$ and the galvanometer, as before. It will be observed, however, that the effect of moving the arm $i$ over arc $h$ is practically to lengthen or shorten or to interpose more or less resistance in the member $a$ of the bridge, and by operating the arm $i'$ a like effect is produced in the member $b$. The resistances or lengths of the members $c$ and $d$ remain unchanged.

Referring now to Fig. 3, there is shown an arrangement which forms the basis of the specific embodiment of the invention, more particularly hereinafter described. In said Fig. 3 the arc $h$ is connected at its respective ends $j$ J to the members $a\ c$, and the arc $h'$ is similarly connected at $j'$ J' to the members $b\ d$. The battery-wires connect to the pivots $l\ l'$ of the arms $i\ i'$, as before. Now when the arm $i$ is moved from its middle position on its arc toward $j$ less resistance is caused in the member $a$ and more resistance in member $c$, and when moved in the opposite direction the reverse occurs. So, also, a similar effect is produced by moving arm $i'$, and thus the resistance offered by all four members of the bridge may be affected instead of that due to only two of them, and differential results may be obtained, as will more fully be apparent in the following description of a device for measuring distances, such as a range-finder for guns.

Referring to Fig. 4, let T be the position of the object the distance of which from the point A it is desired to ascertain. Let AB be any short base-line. Draw AC at right angles to BT, EA parallel to BT, and prolong AT as to D. By trigonometry AC=AT sin ATC } and { AC=AB sin ABC, whence
AT=AC cosec ATC        AT=AB sin ABC cosec ATC.

AB, being the measured base-line, is known, and the angle ABC at the point of observation is easily determined, so that the angle ATC remains to be found; but ATC=DAE, and DAE is subtended and measured by the arc GH. Arc GH=arc $j$H−arc $j$G, and arc $j$H=arc J'K; hence arc GH=arc $j'$K−arc $j$G.

In Fig. 5 the diagrams Figs. 3 and 4 are combined, $i\ i'$, as before, being swinging arms traversing the arcs $h\ h'$, and the connections $a\ b\ c\ d$ of the bridge being present also, as before. Let the arms $i$ and $i'$ represent alidade-arms or telescopes, both directed upon the object T. The arcs $j$G and $j'$K not being equal, the bridge will not balance; but when the telescope $i$ is moved to the line EH then the bridge will balance; but the distance thus moved is the arc GH, the length of which may be read off from the arc $h$ itself. It will be seen, therefore, that the operation of determining the distance AT becomes, by the aid of this apparatus, exceedingly simple. The observers at the respective telescopes $i$ and $i'$ direct their lines of sight upon the object. The observer at $i$ notes the angle $j$AG or length of arc $j$G. He then moves the telescope $i$ until the galvanometer $g'$, which may be placed conveniently near his position, shows no deflection, and notes the angle $j$AH, or length of arc $j$H. The difference between the arcs $j$G and $j$H equals the arc GH, whence the angle ATB, and hence the distance AT, is found by the observer at the arm $i$, or, in other words, by an observer at the base-line. The disposition of the apparatus whereby an observer at a point distant from said base-line may at once read off the distance AT from a suitable scale will now be explained.

Referring to Fig. 6, the members $a$ and $b$ of the bridge are connected to opposite extremities of a bar $m\ n$ of conducting material, and the members $c\ d$ are connected to the extremities of a similar and parallel bar $o\ p$. Adjustable upon said bars $o\ p$ and $m\ n$ is a slider $r\ r'$, having a middle portion $s$ of insulating material, so that the current from bar $m\ n$, for example, does not pass across said slider $r\ r'$ to bar $o\ p$, but proceeds by the wire $g$ through the telephone $g''$, which here takes the place of the galvanometer $g'$ in the preceding figures. Interposed in the battery-wire, as at $t$, is any form of automatic circuit-breaker or "buzzer," the object of which is to produce an audible sound in the telephone $g''$. Suppose, now, that the telescopes $i$ and $i'$ are sighted upon the distant object T, as before, and that the slider $r$ is at the middle point 1 of the parallel bars $m\ n$ and $o\ p$. The resistances in the bridge will obviously not balance, and the sound of the buzzer will be heard in the telephone $g''$. It has already been explained in connection with Fig. 5 how, by moving telescope $i$ to the point H, the resistances might be balanced, and if that were done, with the arrangement shown in Fig. 6, the fact would obviously be indicated by a cessation of sound from the telephone; but, now, let it be assumed that the telescope $i$, after being sighted upon the object T, is not moved, or, in other words, that the observers respectively at the two telescopes $i$ and $i'$ simply adjust their instruments in line with T. Obviously, then, the distance of the bridge from $r$ to G (member $a$) is less than the distance from $r$ to $k$ (member $b$) by the length of the arc GH. Similarly the distance on the bridge from $r'$ to G (member $c$) is greater than the distance from $r'$ to $k$ (member $d$) by the length of arc GH.

Now let the resistance per unit length of the bars $m\ n\ o\ p$ be made equal to or with some definite relation to the resistance per unit length of the arcs h h' and lay off on bar m n a distance r 3 and on bar o p a distance r' 3, said distances being such that the resistance due thereto will be equal to that of the arc GH. Clearly, if the end r of the slider be moved to the position 2 on bar m n, the member a will be increased and the member b will be diminished by the distance r 2, which offers a resistance equal to one-half that of arc GH, and if the end r' of the slider be moved to the position 2 on bar o p then the member c will be decreased and the member d increased by the distance r' 2, which also has a resistance equal to one-half of arc GH. As both ends of the slider move simultaneously, it follows that when its extremities are adjusted in the position 2 then the bridge will balance and the sound in the telephone will cease. Applying this practically, let the bars m n o p be laid off in suitable scale-divisions from r to n and i' to p. The two telescopes i and i' being sighted on the object, the distant observer listens at the telephone g'' and moves the slider r r' along the bars m n o p until the sound ceases. The scale marked on the bars then shows an indication corresponding to the length of arc GH, or, if desired, actual distances corresponding to such indications.

To illustrate the practical utility of the apparatus, the following instances may be given: The telescopes i i', suitably mounted upon their arcs h h', are given to two observers, who proceed to a skirmish-line, or to any other advanced position, and, selecting a base-line of predetermined length, train their instruments upon any desired point of an enemy's works or column. The fact that this is done may be indicated by any suitable flag-signal, or by one sent electrically to the rear over the bridge-connections. The observer at the telephone g'' may be supposed to be stationed in proximity to a battery of guns ready to open fire. As soon as the signal is sent that the telescopes are sighted the observer at the telephone adjusts the slider r r' until the sound in the instrument ceases, and then determines the range from the marks on the bars m n o p when the guns are laid accordingly. The invention is, however, especially applicable to use in connection with pneumatic guns for the projection of shells charged with high explosives. A gun of this type is placed in the bow of a vessel at a certain fixed elevation—for example, eighteen degrees—and the range of the projectile is regulated by varying the air-supply admitted to the gun. It thus becomes highly important to determine the distance of the target with all possible accuracy. The two telescopes i i' may be mounted on opposite sides of the vessel's upper deck, her breadth of beam, for example, being the known base-line, while the telephone g'' may be located below and convenient to the air-regulating valve of the gun. The observers on the upper deck train their telescopes on the object, and the observer at the telephone determines the distance in the manner already described, and in accordance with this determination adjusts the valve.

The specific apparatus herein set forth, which constitutes one practical means of carrying my invention into effect to produce beneficial results, is fully described and claimed in another application filed by me on the 17th day of October, 1888, Serial No. 288,505, of which application this my present application is a division.

I claim—

1. The improvement in the art of finding the range of a distant object, which consists in first determining a fractional portion of a conducting-body bearing in length a ratio to the angle included between two lines of sight directed upon a distant object, and, second, measuring the electrical resistance of said length, substantially as described.

2. The method of determining the angle included between two lines of sight directed upon a distant object, which consists, first, in directing two alidade-arms located at opposite ends of a base-line longitudinally in line with said object, the said arms establishing and maintaining contact with similar bodies of conducting material similarly disposed with reference to said base-line; second, measuring the difference between the electrical resistances of the lengths of said conducting-bodies included between corresponding extremities of the aforesaid bodies and the adjusted positions of the contact-points governed by said arms, substantially as described.

3. The method of determining the angle included between two lines of sight directed upon a distant object, which consists in, first, directing two pivoted alidade-arms located at opposite ends of a base-line longitudinally in line with said object, the said arms being pivoted at one extremity and having their other extremities moving over arcs of conducting material; second, placing one arm parallel to the other arm, and thereby establishing an electrical balance; third, measuring the length of the arc included between the initial and final positions of said last-mentioned arm, substantially as described.

BRADLEY ALLAN FISKE.

Witnesses:
PARK BENJAMIN,
M. BOSCH.